(12) United States Patent
Krueger et al.

(10) Patent No.: US 10,554,741 B1
(45) Date of Patent: *Feb. 4, 2020

(54) POINT TO NODE IN A MULTI-TIERED MIDDLEWARE ENVIRONMENT

(71) Applicant: United Services Automobile Association (USAA), San Antonio, TX (US)

(72) Inventors: Clayton Ray Krueger, San Antonio, TX (US); Phillip Carl Schwesinger, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/283,308

(22) Filed: Feb. 22, 2019

Related U.S. Application Data (63) Continuation of application No. 15/480,213, filed on Apr. 5, 2017, now Pat. No. 10,270,848, which is a continuation of application No. 13/801,670, filed on Mar. 13, 2013, now Pat. No. 9,686,158.

(51) Int. Cl.
| | |
|---|---|
| H04L 29/08 | (2006.01) |
| H04L 12/721 | (2013.01) |
| H04L 12/707 | (2013.01) |
| H04L 29/12 | (2006.01) |

(52) U.S. Cl.
CPC .......... *H04L 67/1025* (2013.01); *H04L 45/22* (2013.01); *H04L 45/44* (2013.01); *H04L 61/2007* (2013.01); *H04L 67/02* (2013.01); *H04L 67/146* (2013.01); *H04L 67/28* (2013.01)

(58) Field of Classification Search
CPC ... H04L 67/1025; H04L 67/02; H04L 67/146; H04L 67/28; H04L 45/22; H04L 45/44; H04L 61/2007
USPC .................................................. 709/203, 226
See application file for complete search history.

(56) References Cited

U.S. PATENT DOCUMENTS

| | | | |
|---|---|---|---|
| 7,328,237 B1 | 2/2008 | Thubert et al. | |
| 7,707,289 B1 * | 4/2010 | Skene ..................... | H04L 29/06 709/217 |
| 7,840,669 B2 | 11/2010 | Dutta et al. | |
| 7,949,757 B2 | 5/2011 | Joshi | |
| 8,073,952 B2 * | 12/2011 | Yoo ..................... | H04L 67/1002 709/226 |
| 8,073,953 B2 | 12/2011 | Christian et al. | |
| 2002/0143946 A1 | 10/2002 | Crosson | |
| 2011/0078303 A1 | 3/2011 | Li et al. | |
| 2011/0202678 A1 | 8/2011 | Lavoie et al. | |
| 2012/0155389 A1 | 6/2012 | McNamee et al. | |
| 2012/0185529 A1 | 7/2012 | Shimamoto | |

OTHER PUBLICATIONS

U.S. Appl. No. 15/480,213, filed Apr. 5, 2017, Point to Node in a Multi-Tiered Middleware Environment.
U.S. Appl. No. 13/801,670, filed Mar. 13, 2013, Point to Node in a Multi-Tiered Middleware Environment.

\* cited by examiner

*Primary Examiner* — Zi Ye
(74) *Attorney, Agent, or Firm* — Perkins Coie LLP (57) ABSTRACT

Systems and methods directing requests to a particular node in a multi-tiered middleware environment are provided. In one embodiment, traffic requests can be dynamically routed to a desired server, and not be load balanced, based on an identification of the client generating the traffic requests.

20 Claims, 8 Drawing Sheets

Route my traffic to:

○ Production

○ QA

◉ Specific Farm Cells/Nodes

Are the cells in Production or QA?
○ Production
○ QA

| Evironment | Cell | | |
|---|---|---|---|
| ☑ Farm A | Cell 1 ⌄ | prodweba1 ⌄ | |
| ☐ Farm B | Select a Cell ⌄ | | |
| ☐ Farm C | Select a Cell ⌄ | | |
| ☐ Farm D | Select a Cell ⌄ | | |

○ Lab Routing

○ Other

Specific LTerm [            ] (single IP address, not lterm)

▦ Defaults
🔍 View
✏ Apply

POINT TO NODE IN A MULTI-TIERED MIDDLEWARE ENVIRONMENT

CROSS REFERENCE TO RELATED APPLICATION

The present application is a continuation of U.S. patent application Ser. No. 15/480,213, filed on Apr. 5, 2017, entitled "POINT TO NODE IN A MULTI-TIERED MIDDLEWARE ENVIRONMENT," now allowed; which is a continuation of and claims priority to U.S. patent application Ser. No. 13/801,670, filed on Mar. 13, 2013, entitled "POINT TO NODE IN A MULTI-TIERED MIDDLEWARE ENVIRONMENT," issued as U.S. Pat. No. 9,686,158 on Jun. 20, 2017, the entire contents of each of which are herein expressly incorporated by reference for all purposes.

TECHNICAL FIELD

Various embodiments of the present invention generally relate to web servers. More specifically, some embodiments of the present invention relate to directing requests to a particular node in a multi-tiered middleware environment.

BACKGROUND

Web servers deliver web pages to clients upon request. Typically, a user enters a domain name into a browser which is then communicated to a domain name server. The domain name server uses the domain name to look up an IP address that can be used to connect to the web server. The web server then delivers the content back to the browser for viewing by the user. In many cases, hypertext transfer protocol (HTTP), or a variant thereof, is used in the communication between the browser and the web server.

Web servers can include hardware and software for delivering the web pages or other content to the client. Unfortunately, web servers have limited resources and can only handle a limited number of concurrent connections. In order to expand the availability of the content, web servers are often grouped into farms of multiple servers having identical content. Since there are multiple servers having the same content, requests from clients can be load balanced among the servers. However, as the number of servers grows, a number of challenges and inefficiencies found in traditional maintenance techniques have been observed.

SUMMARY

Systems and methods are described for directing traffic requests to a particular node in a multi-tiered middleware environment. For example, traffic can be specifically routed to a desired server, and not load balanced, based on an identification of the client. In some embodiments, a request generated by a client can be received (e.g., at a proxy or load balancer) to access content from a farm of application servers within a multi-tiered environment. The client may be a specific client, which is referred to as a point to node client, that will have traffic requests directed to a designated application server or virtual container within the designated application server. Upon determining that the traffic originated from the specific client (e.g., by using an IP address), that traffic will be routed to the designated application server or virtual container. Additionally, the virtual container will be removed from normal production routing (e.g., traffic will not be routed to the virtual container by the load balancer).

Some embodiments, for example, provide for a host file manager to update and identify the virtual container as removed from normal production routing. The traffic from the point to node client can be used to validate the application server and/or virtual container without having to take the application server off-line. After validation is completed, the application server and/or virtual container may be returned to normal load balancing production routing.

Embodiments of the present invention also include computer-readable storage media containing sets of instructions to cause one or more processors to perform the methods, variations of the methods, and other operations described herein.

In some embodiments, incoming traffic can be received at a proxy. The incoming traffic may be directed to a farm having a plurality of nodes within a multi-tiered environment. As the traffic is received, a determination can be made as to whether any of the traffic has originated from a point to node client. If a determination has been made that the traffic has originated from a point to node client, a destination node can be identified and any of the associated traffic routed to the destination node. Any traffic not associated with the point to node client, may be routed to a load balancer for distribution to other nodes.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present invention will be described and explained through the use of the accompanying drawings in which.

The drawings have not necessarily been drawn to scale. For example, the dimensions of some of the elements in the figures may be expanded or reduced to help improve the understanding of the embodiments of the present invention. Similarly, some components and/or operations may be separated into different blocks or combined into a single block for the purposes of discussion of some of the embodiments of the present invention. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Various embodiments of the present invention generally relate to web servers. More specifically, some embodiments of the present invention relate to directing requests to a particular node in a multi-tiered middleware environment. A multi-tiered environment (see, e.g., operating environment 100 in FIG. 1) generally refers to a client-server architecture that logically separates various functions into tiers within the environment (e.g., application processing, presentation, and data management). In the case of a web environment, a three-tier architecture is often used which commonly includes a front end server, a middle application server, and a back-end data store. Front-end web servers may be used to serve static or dynamic content. Application servers can be used for dynamic content processing. The data store can be used to manage storage and access to data.

As websites grow, larger-tiered environments are becoming more common in order to split workload. In order to expand the availability of content, web servers are often grouped into farms of multiple servers having identical content. Generally, when a user sends traffic such as a request to view a website or access an application, the traffic is sent to the group of appropriate servers. In some cases, for example, the traffic may be sent to the appropriate server that has the most capacity at the time of the request. A load balancer may determine which of the servers will receive the traffic.

Servers, or instances of servers, need to be serviced, validated, or tested periodically or when a problem is discovered. It may be difficult to isolate and send traffic to a specific server instance in order to perform validation and/or testing. One workaround includes taking an entire cell of servers out of service and performing manual manipulation of the environment to send the testing client's traffic to only one server. In this workaround, any servers that are off line may be manually taken out of a configuration file at an HTTP server such that the server will not be validated and no requests will be sent to the server. However, pulling an entire cell out of service may result in slow service for other users. Further, manually manipulating the environment increases the risk of human error and may be inefficient.

In various embodiments, the infrastructure on the load balancer is partnered with a proxy infrastructure, allowing an override for a single user's (i.e. testing client's) traffic for a specific tier of the middleware to a single server instance. This allows the server cell to stay online and take full production traffic with only the specific instance of the cell is being tested, validated, upgraded, etc. while being taken offline to all users except specific users (e.g., testing clients). Moreover, this avoids the manual manipulation of the server cell.

In an example, a client may send a request (e.g., a universal resource locator) to access content from a farm of application servers. The request may be received at the load balancer, where a determination can be made as to whether the client is a point to node client (e.g., users who are testing, upgrading, etc.) instead of a production client, which includes clients other than the point to node clients. If the client is determined to be a point to node client, then the point to node client request is routed to a virtual container/ particular node that is not accepting traffic from production clients. The client may be identified by internet protocol (IP) address and documented in a user cache. In some embodiments, a host file manager may use a host file manager to identify the virtual container as removed from normal production routing.

In the following description, for the purposes of explanation, numerous specific details are set forth in order to provide a thorough understanding of embodiments of the present invention. It will be apparent, however, to one skilled in the art that embodiments of the present invention may be practiced without some of these specific details.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," and the like generally mean the particular feature, structure, or characteristic following the phrase is included in at least one implementation of the present invention, and may be included in more than one implementation. In addition, such phrases do not necessarily refer to the same embodiments or different embodiments.

If the specification states a component or feature "may", "can", "could", or "might" be included or have a characteristic, that particular component or feature is not required to be included or have the characteristic.

The term "module" refers broadly to a software, hardware, or firmware (or any combination thereof) component.

Modules are typically functional components that can generate useful data or other output using specified input(s). A module may or may not be self-contained. An application program (also called an "application") may include one or more modules, or a module can include one or more application programs.

Computer System Overview

Figure 1:
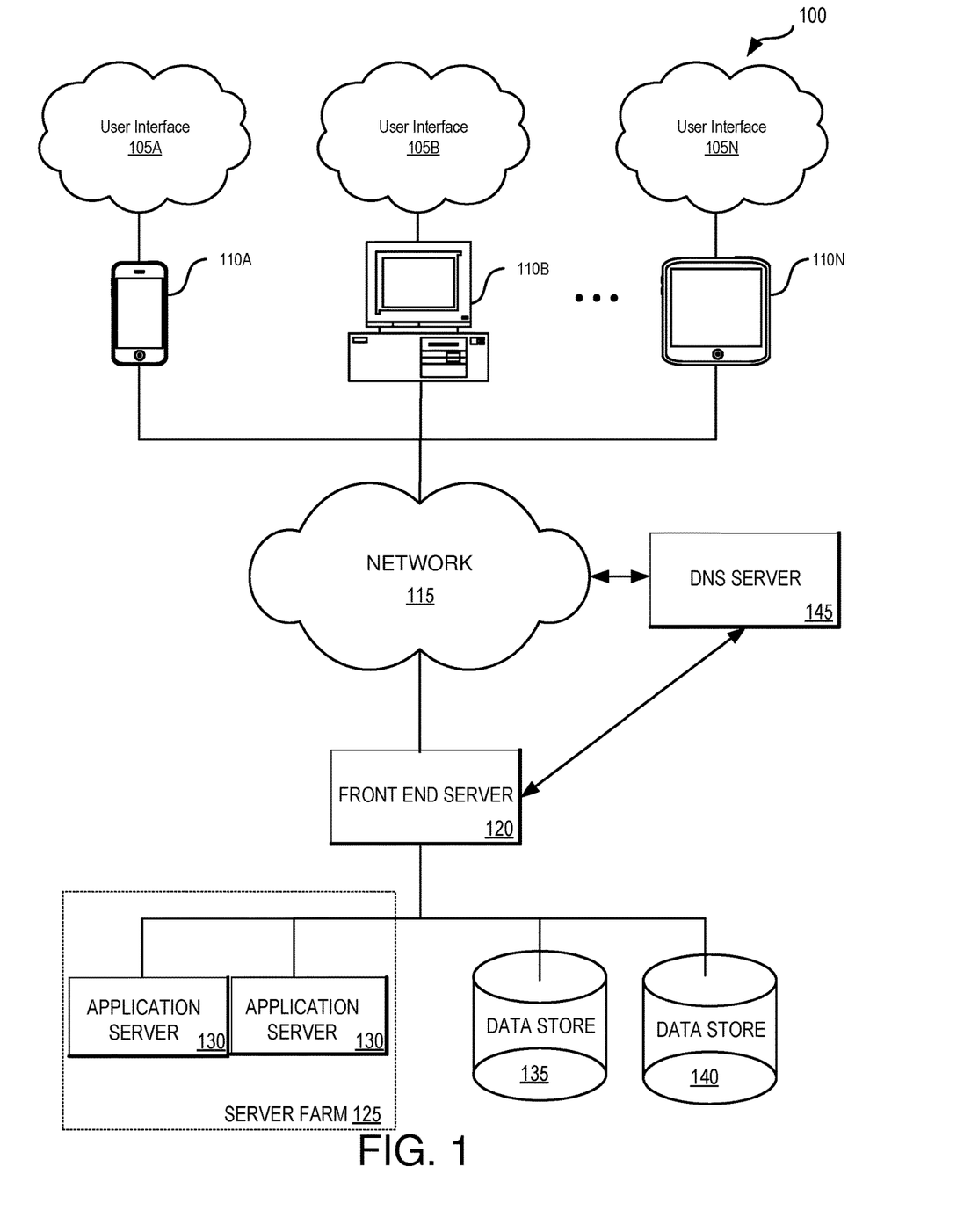
FIG. 1 illustrates an example of an environment in which some embodiments of the present invention may be utilized.

FIG. 1 illustrates an example of an operating environment 100 in which some embodiments of the present invention may be utilized. As illustrated in FIG. 1, operating environment 100 may include user interfaces 105A-105N running on one or more points of interaction or client-machines 110A-110N (such as a mobile device, a mobile phone, a tablet computer, a mobile media device, a mobile gaming device, a vehicle-based computer, a dedicated terminal, a public terminal, a kiosk, etc.). These points of interaction can include mechanisms for receiving and sending traffic by connecting through network 115 to front end server 120, server farm 125, application servers 130, data store 135, and data store 140. For example, points of interaction 110A-110N may run one or more applications or clients that allow a user to interact with server farm 125. Such applications may provide access to information such as information stored in data store 135.

In addition, points of interaction 110A-110N can include network communication components that enable the points of interaction to communicate with network 115 or other electronic devices by transmitting and receiving wireless signals using licensed, semi-licensed or unlicensed spectrum over network 115. In some cases, network 115 may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. Network 115 can also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network, or other communications network.

Client-machines may be devices that connect to an application server such as application server 130 over HTTP or other protocol. The client may be an end user with a browser on a client-machine, or clients may be another application making a service call. Clients may interact over network 115 with front end 120, data store 135 and 140, server farm 125 and associated application servers 130, in accordance with a client/server model of information delivery. That is, the client(s) may request the services of front end server 120, data store 135, data store 140, server farm 125 and associated application servers 130, and the system may return the results of the services requested by the client, such as by exchanging packets over the network 115. A multi-tiered environment, such as the example of operating environment 100 shown in FIG. 1, generally refers to a client-server architecture that logically separates various functions into tiers within the environment (e.g., application processing, presentation, and data management). In the case of a web environment, a three-tier architecture is often used which commonly includes front end server 120, middle application servers 130, and back-end data stores 135 and 140. Front-end server 120 may be a web server that is used to serve static or dynamic content such as websites. Application servers 130 can be used for dynamic content processing. The data stores 135 and 140 can be used to manage storage and access to data.

Front end server 120 may be a web server (e.g., HTTP server) that receives client requests for a URL. Front end server 120 may include one or more load balancers (such as an F5 load balancer) that allow inbound traffic to be distributed across multiple back-end destinations such as server farm 125 and associated application servers 130. Organizations may have multiple front end servers and load balancers.

Load balancers may receive inbound traffic from one or more clients and ensure reliability and availability of services by monitoring the "health" of applications and only sending requests to servers and applications that can respond in a timely manner. Load balancers may be used to increase capacity (concurrent users) and may improve the overall performance of applications by decreasing the burden on servers associated with managing and maintaining application and network sessions, as well as by performing application-specific tasks. Load balancers may act as a reverse proxy and distribute network or application traffic across a number of servers such as the servers in server farm 125. In an example, a load balancer may be a web sphere plugin module which routes dynamic content requests received by one or more front end servers 120 to the application servers 130. The websphere plugin module or equivalent module may contain code that allows the functionality to specifically route a request to the desired server and not load balance the request based on an identification of the client. Load balancers are generally grouped into two categories: Layer 4 and Layer 7. Layer 4 load balancers act upon data found in network and transport layer protocols (IP, TCP, FTP, UDP). Layer 7 load balancers distribute requests based upon data found in application layer protocols such as HTTP. Requests may be received by both types of load balancers and distributed to a particular server based on a configured algorithm. Some industry standard algorithms are: round robin, weighted round robin, least connections, and least response time. Layer 7 load balancers can further distribute requests based on application specific data such as HTTP headers, cookies, or data within the application message itself, such as the value of a specific parameter. Application servers 130 may be a java virtual machine (JVM) that runs an Enterprise Applications (EARs) or other applications. Back-end destinations such as the application servers 130 may be in a collection referred to herein as farms, pools, or clusters, such as server farm 125. These farms are collections of similar services available on any number of hosts. For instance, all services that offer the company web page may be collected into a farm called "company web page" and all services that offer e-commerce services may be collected into a farm called "e-commerce." Application servers 130 may include numerous virtual containers of different applications. One virtual container or node may be taken out of service for upgrades, testing and/or maintenance. The virtual container may be validated before putting it back in service. Validating a virtual container may be done by routing procedures defined by the organization.

Data stores 135 and 140 may be a data repository of a set of integrated objects that are modeled using classes defined in database schemas. Data store may further include flat files that can store data. Application servers 130 may collect and/or access data from the data stores.

Domain name system (DNS) server 145 may be a database system that translates a computer's fully qualified domain name into an IP address. Organizations that maintain a computer network typically include at least one server handling DNS queries. DNS server 145 may hold a list of all the IP addresses within its network, plus a cache of IP addresses for recently accessed computers outside the network. When a user sends a request to view a web page, the requested IP address is analyzed. If the requested IP address is registered locally (i.e., within the organization's network), the user will receive a response directly from one of the local DNS servers in the user's device configuration. If the requested IP address is not registered locally (i.e., outside the organization's network) but someone within the organization has recently request the same IP address, then the DNS will retrieve the IP address from its cache. If the requested IP address is not registered locally and the user is the first person to request information about the IP address in a certain period of time (e.g., 12 hours to one week), the DNS server will perform a search on behalf of the device. The search may include querying other DNS servers at remote locations.

Figure 2:
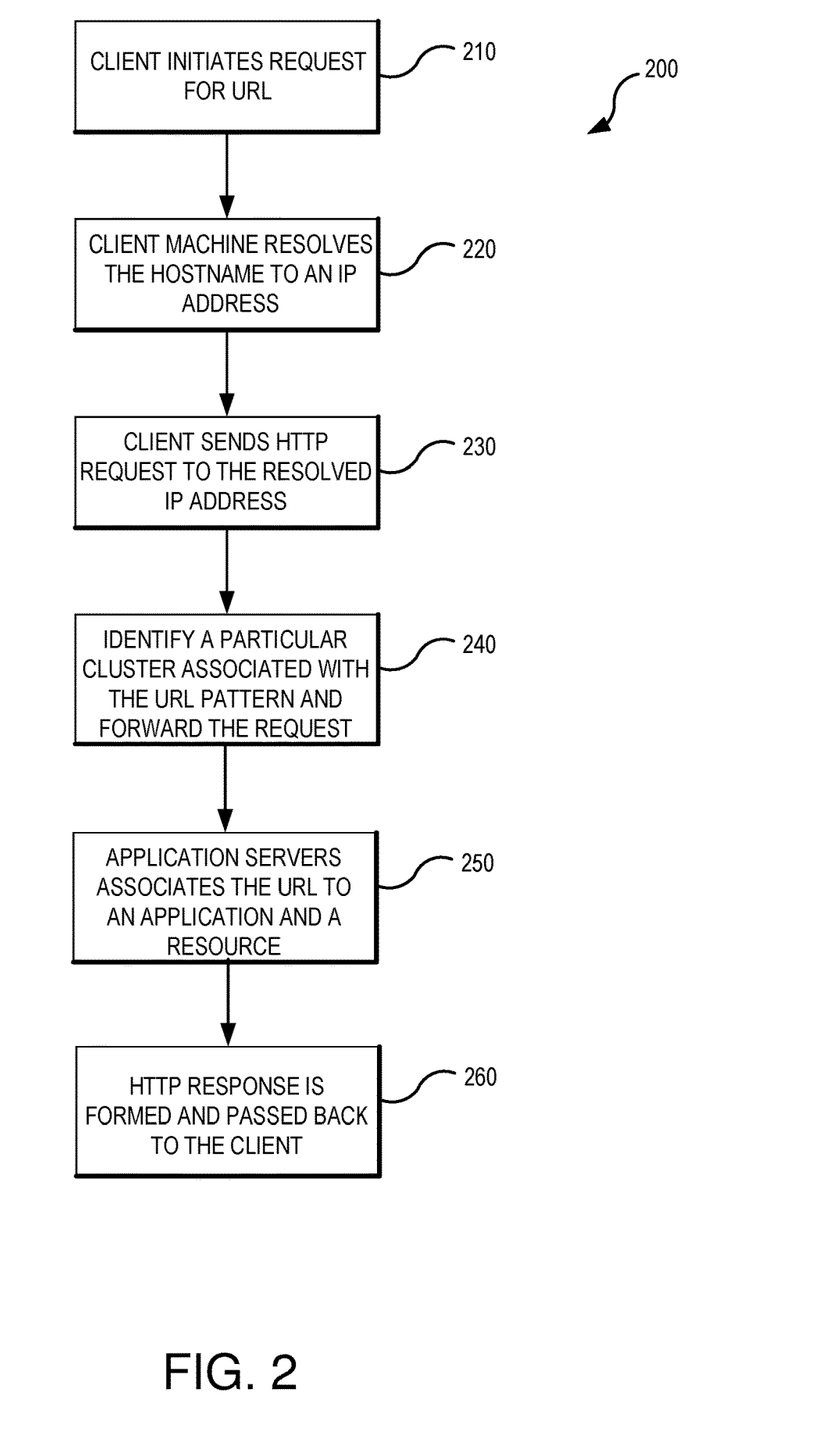
FIG. 2 is a flowchart having an exemplary set of instructions for processing a client request in accordance with one or more embodiments of the present invention.

FIG. 2 is a flowchart having an exemplary set of instructions 200 for processing a client request in accordance with one or more embodiments of the present invention. The operations can be performed by various components such as processors, points of interaction 110A-110N, front end server 120, DNS server 145, and/or other components.

In initiation operation 210, a client initiates a request for a URL. This may be done by clicking on a link, a bookmark, or submitting information on a webpage. In some embodiments initiation operation 210 can include an application making a web service call to a URL. The request may be initiated on the web browser of a client-machine such as mobile device 110A, computer 110B, tablet computer 110N, and may be received by front end server 120.

In resolution operation 220, the client machine (e.g., devices 110A-110N) resolves the hostname to an IP address. If an entry exists in the client machine's host file, then the IP address in the host file is used. If no entry exists, then the client machine queries the DNS server (local or remote) for the IP address. Once the IP address is obtained, request operation 230 sends the request for the URL (HTTP request) to the resolved IP address.

The request may be received by front end server 120 or other web server. Front end server 120 may identify a particular cluster or farm (e.g., server farm 125) associated with the URL pattern and may forward the request to the appropriate application server (e.g., server 130) in identifying and forwarding operation 240. Each cluster may contain multiple applications servers with identical content, such as application servers 130. Application servers 130 may further contain virtual containers of applications. The virtual containers may be identified by nodes. One or more load balancers (or plugin modules) may associate the URL pattern to a particular cluster and forward the request to the hostname and port of an application server associated with the cluster. Once the request is received by an application server, the application server associates the URL to an application and a resource (e.g., servlet or java service page (JSP)) in associating operation 250. In some embodiments, the application server makes calls to backend systems (e.g., data stores, IMS or other host systems, or middleware). In response operation 260, a HTTP response is formed and passed back to the client. This response may include the requested webpage the client requested.

Figure 3:
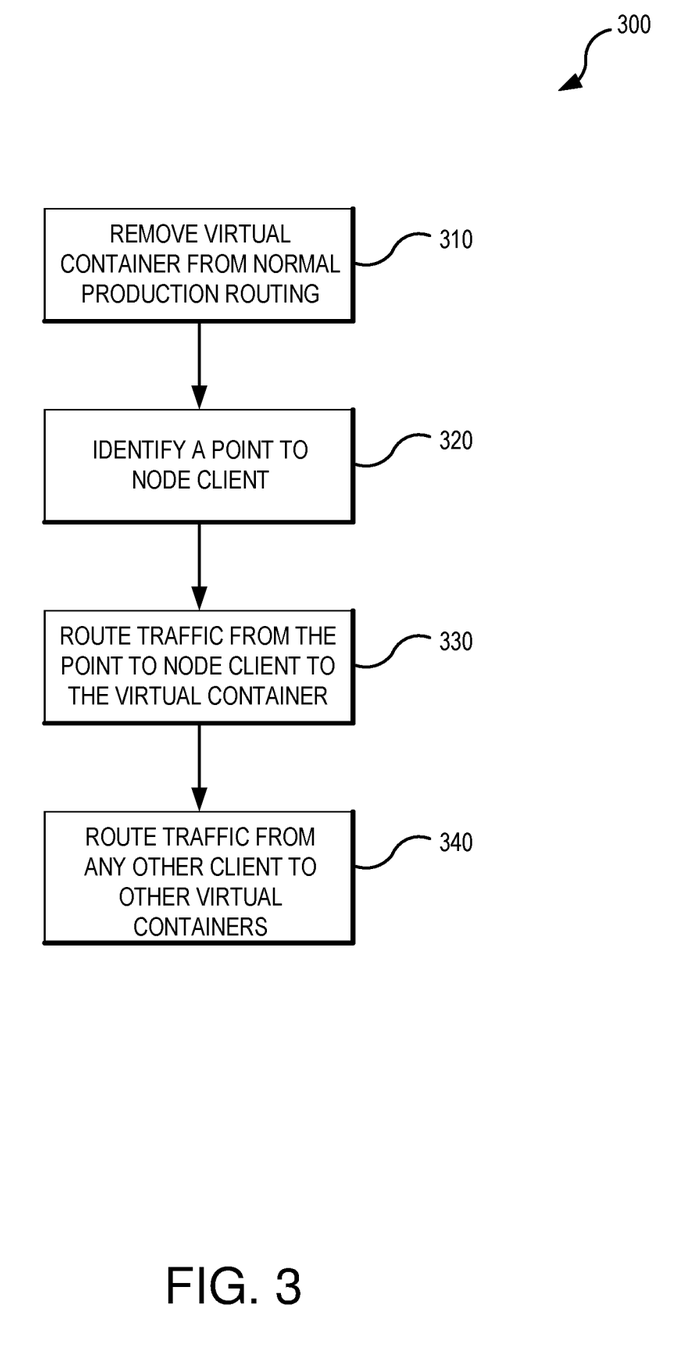
FIG. 3 is a flowchart having an exemplary set of instructions for dynamically routing client requests in accordance with various embodiments of the present invention.

FIG. 3 is a flowchart having an exemplary set of instructions 300 for dynamically routing client requests in accordance with various embodiments of the present invention. The operations can be performed by various components such as processors, points of interaction 110A-110N, front end server 120, DNS server 145, and/or other components (e.g., a host file manager).

Removal operation 310 removes a virtual container from normal production routing. When the virtual container is removed from normal production, URL requests received from production clients will not be routed to the virtual container as part of the normal load balancing operations. Removing the virtual container may include removing it as an option for a web server to direct the request to such as by including specific routing instructions in memory cache which are used by the load balancer in determining where to route a request. A virtual container may be removed from normal production in order to do testing or maintenance on one or more applications within the virtual container, allowing the server to continue servicing production clients in areas besides the virtual container.

Identifying operation 320 identifies a point to node client at a web server. The point to node client may be identified by configuring a load balancer which caches client override information. For example, the client may be identified from an IP address, cookie information, header information, etc. Once the point to node client has been identified, routing operation 330 routes the traffic from the point to node client to the removed virtual container if the removed virtual container is the target environment of the point to node client. In operation 340, requests received from production clients are routed to other virtual containers.

Figure 4:
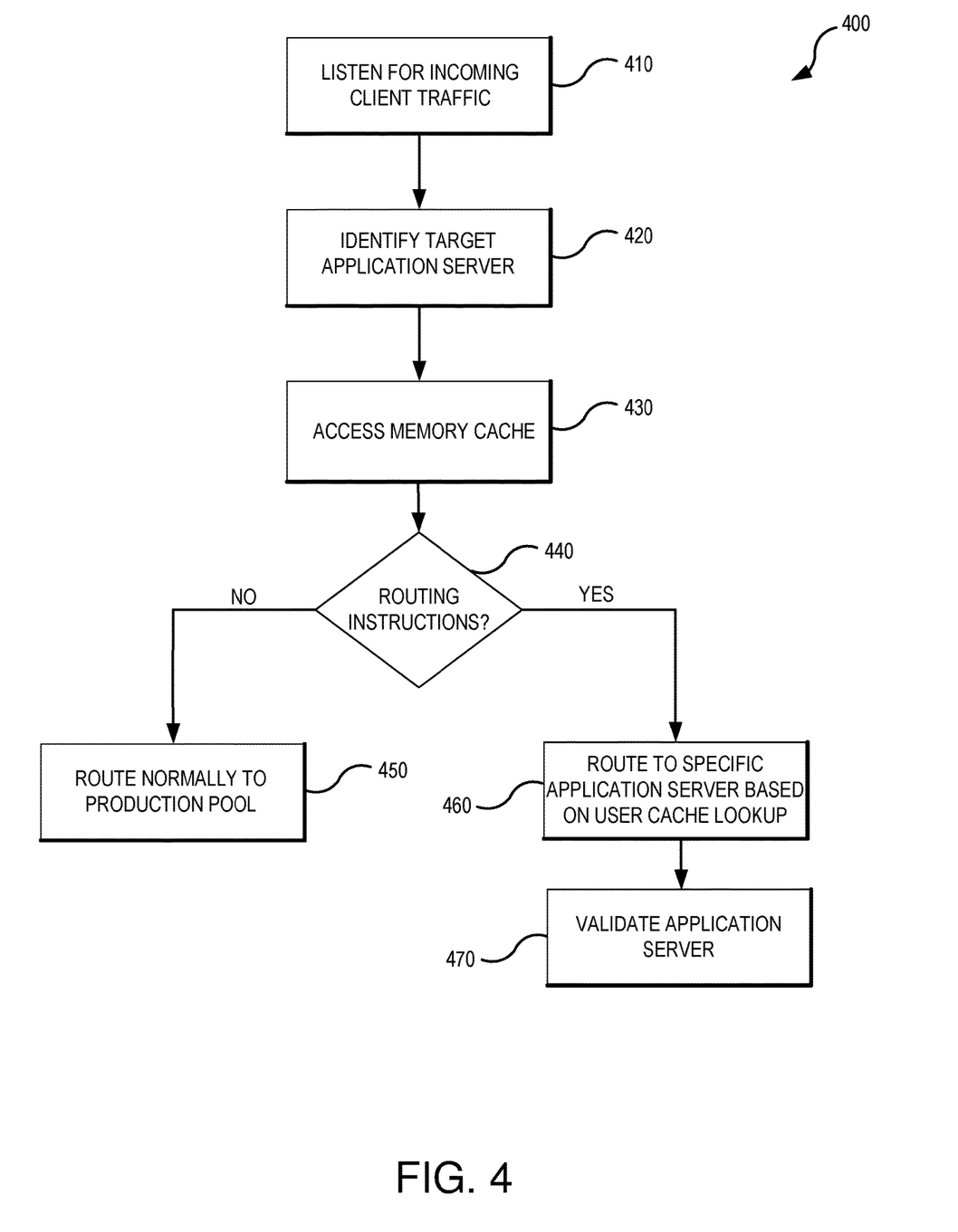
FIG. 4 is a flowchart having an exemplary set of instructions for validating application servers in accordance with some embodiments of the present invention.

FIG. 4 is a flowchart having an exemplary set of instructions 400 for validating application servers in accordance with some embodiments of the present invention. The operations can be performed by various components such as processors, points of interaction 110A-110N, front end server 120, DNS server 145, and/or other components.

In listening operation 410, a load balancer, proxy, or other web server plugin module listens for incoming client traffic such as a web page request. In identifying operation 420, a target application server is identified for the request. This may be done by various load balancing algorithms and may depend on various factors such as an identification of the client, current capacity of the application server, and so on. Access operation 430 can access a memory cache to determine if special routing instructions are present for the traffic (e.g., a packet) or if the traffic should be routed to the destination using a load balancer. For example, in some embodiments, a memory cache may have a configuration file with a set of rules which can be used to identify and route the packets based on information about the traffic (e.g., origination IP address, content, etc.).

Figure 5:
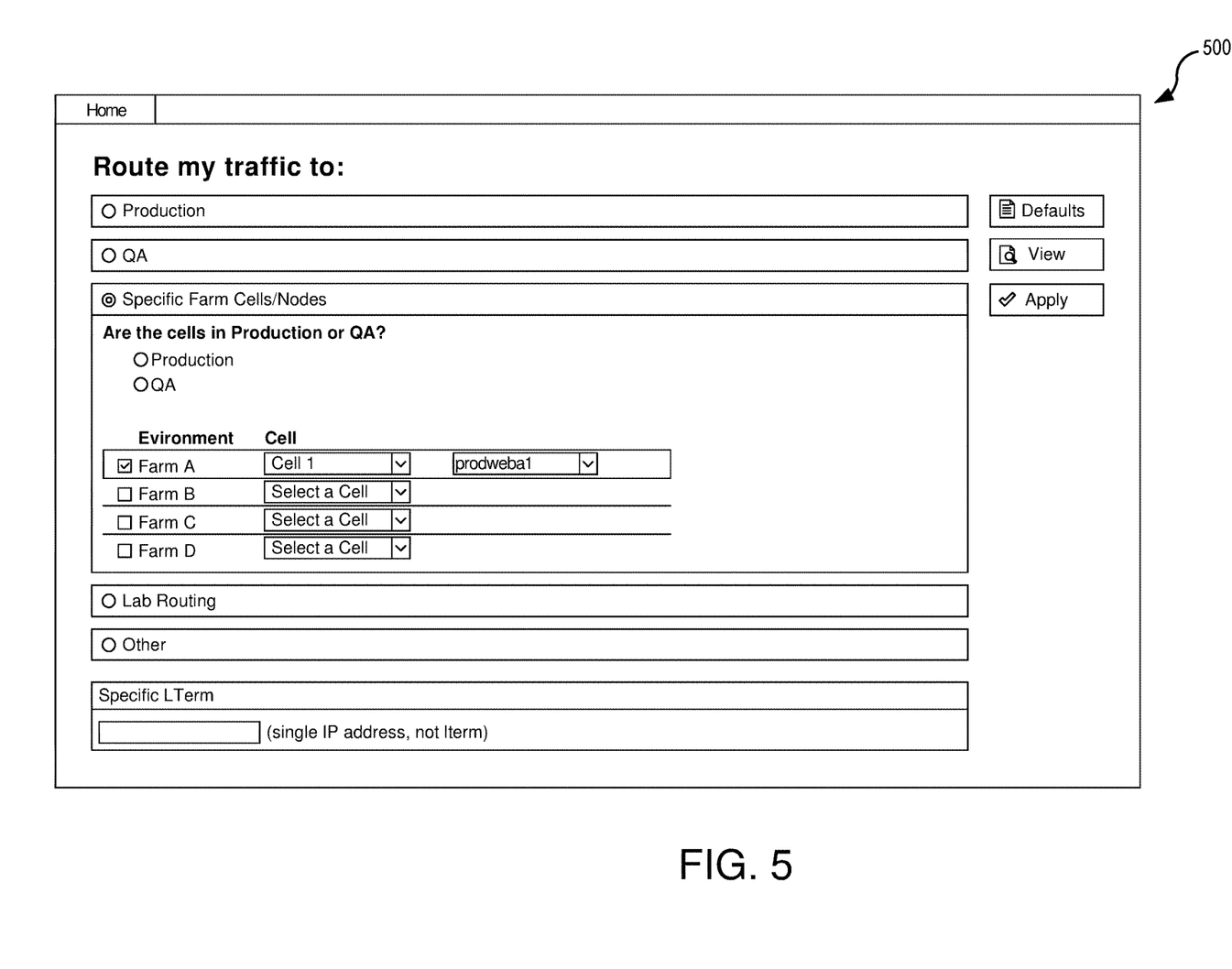
FIG. 5 illustrates a graphical user interface that can be used to set traffic destinations from point to node clients in accordance with one or more embodiments of the present invention.

In routing instruction determination operation 440, the load balancer determines whether special routing instructions apply to the client making the request. The client may be identified by IP address. If no routing instructions apply to the client, then the request is routed normally to the production pool in production routing operation 450. If special routing instructions apply to the client (e.g., the client's IP address is identified as a point to node client), the request is routed to a specific application server based on user cache lookup in point to node routing operation 460. For example, the user cache may identify specific application servers that a particular client will be directed to. In validation operation 470, the point to node client validates the application server. FIG. 5 illustrates a graphical user interface 500 that can be used to set traffic destinations from point to node clients in accordance with one or more embodiments of the present invention. A user may identify whether the user is a production client or a quality assurance (point to node) client state. The user may identify specific farm cells or nodes and asked whether the cells are in production or quality assurance. In the example user interface depicted in FIG. 5, the user may identify an environment (e.g., Farm A, Farm B, Farm C, Farm D), a cell, and a load balancer. Of course other configurations may be possible depending on the operating environment, access level of the user, and other factors.

Figure 6:
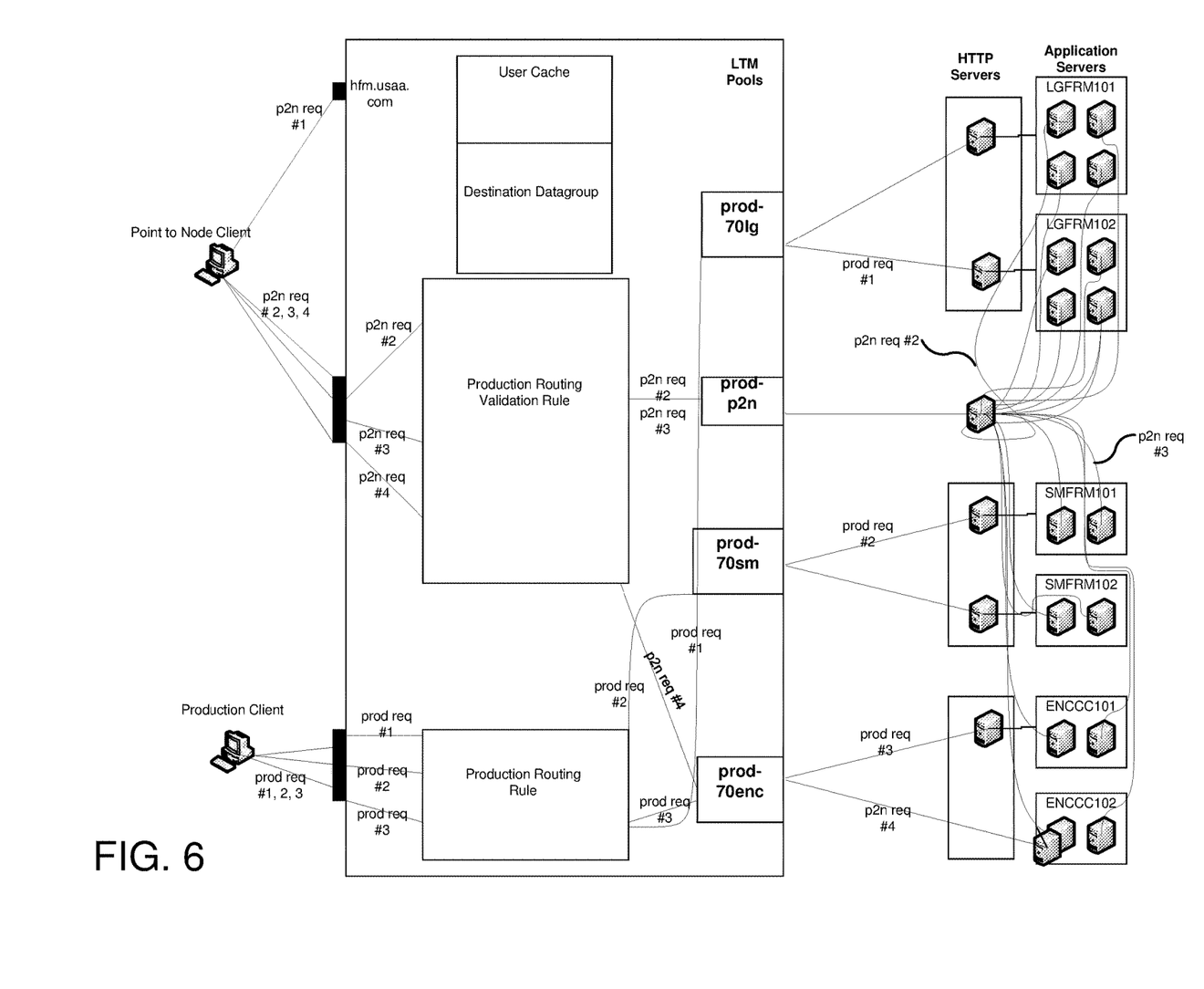
FIG. 6 illustrates a multi-tiered middleware environment in accordance with various embodiments of the present invention.

FIG. 6 illustrates a multi-tiered middleware environment in accordance with various embodiments of the present invention. Generally, in FIG. 6, a point to node client and a production client make an HTTP request. The requests are received into a load manager where the requests are evaluated by rules to determine a routing of the request. The requests are routed to load traffic manager pools and then to HTTP servers. From the HTTP servers, the request is routed to an application server. More specifically, in FIG. 6, a point to node client makes point to node requests 1-4 (p2n req #1-4). Using the point to node client's IP address, a host file manager tool updates the client's hosts file with override. Point to node request #1 requests a URL (e.g., hrm.usaa.com) that is used to configure a user cache. The user cache includes a list of IP addresses with corresponding nodes or target environments. In some embodiments, the point to node IP address is used with a query string of HTTP requests to create an entry in the user cache. A rule may be applied to the URL configuration to perform this action. For each request, a destination mapping set may be determined and used in determining the routing.

Point to node requests #2-4 are evaluated by a production routing validation rule. The validation routing rule may first look at information in the destination mapping associated with the request such as the context root (e.g., environment) of the HTTP request. A pool of load traffic managers are built for the request. This generated list can be the same list that would be generated if the request originated from a production client. Because the client has been identified as a point to node client, the rule then compares the entries for the point to node client's IP address in the user cache to determine whether any of the requests are for the target environment. If it is determined that the request is for a target environment, then the context root can be prepended with the appropriate server name as specified in the user cache entry. An example of the modified server name may be "prodweb1." The request is then sent to the production point to node pool (prod-p2n pool) with the configured routing proxy to send the request to a single node. This is split off by overriding a user's hosts file to a different IP address so normal production users do not see a performance impact of the additional user cache lookups.

Normal production clients do not have an entry in the client's host file. Typical DNS entries are used in routing production requests. In FIG. 6, the production client makes production requests #1, 2, and 3 (prod req #1, 2, 3), which are received into the load balancer. Production routing rules look up the requested target environment in the destination mapping. Using the target environment, the load balancer dynamically builds a pool name (e.g., prod-70lg, prod-70sm) to send the request to. The load balancer balances the request amongst HTTP servers, the cells within the HTTP servers (application servers), and the nodes within the cells (e.g., virtual containers of applications, applications).

As shown in FIG. 6, the requests are then routed to a load traffic manager pool appropriate for the request, and thereafter sent an HTTP server, and finally to an application server as determined by the load balancer. For example, the point to node requests #2 and 3 are routed to the prod-p2n pool. From the HTTP server, point to node request #2 is routed to large farm application server 101, and point to node request #3 is routed to small farm application server 101.

Figure 7:
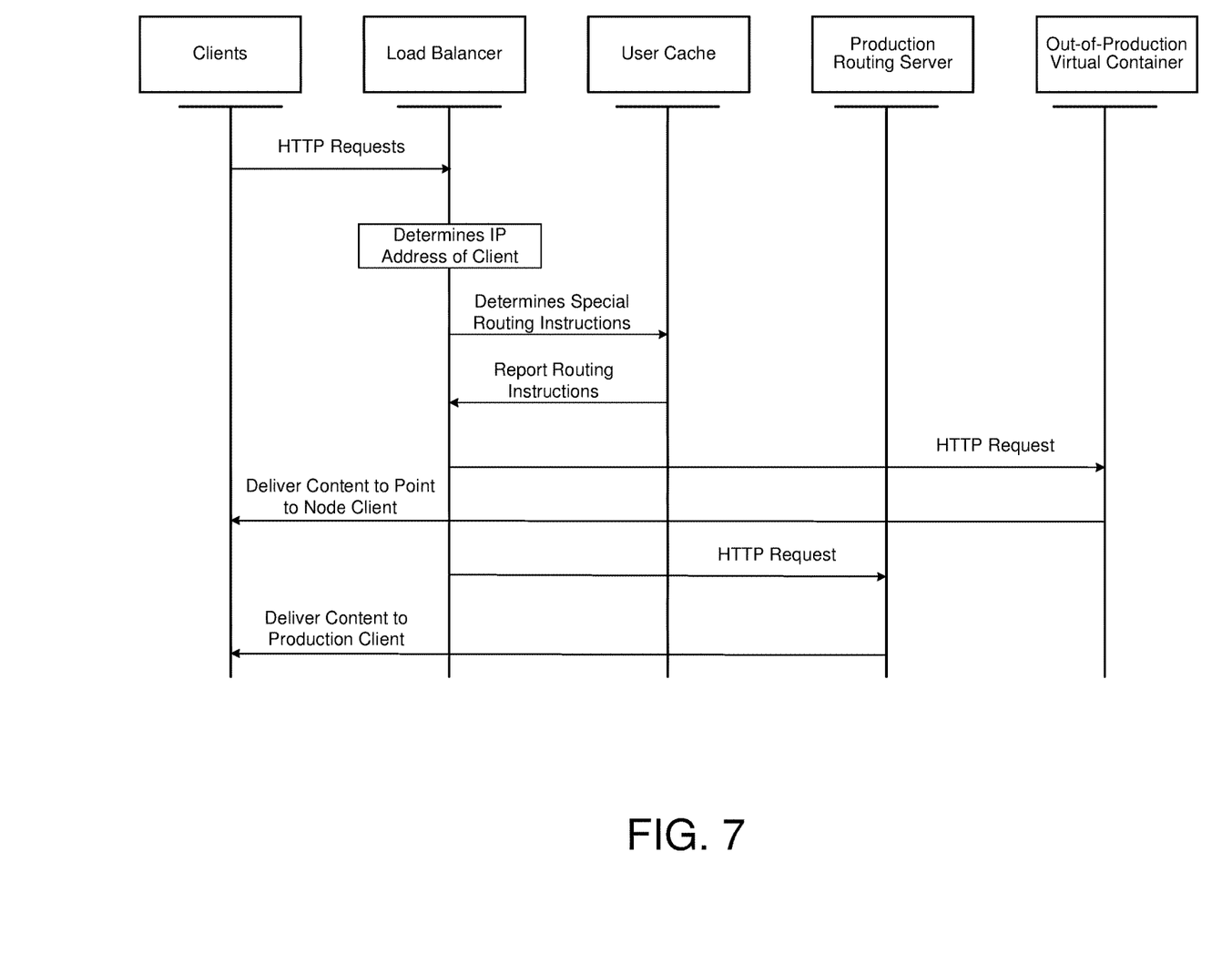
FIG. 7 is a sequence diagram illustrating communications between various components of a multi-tiered middleware environment in accordance with some embodiments of the present invention.

FIG. 7 is a sequence diagram illustrating communications between various components of a multi-tiered middleware environment in accordance with some embodiments of the present invention. A client sends a URL request or other HTTP request, which is received by the load balancer. The load balancer determines or is provided an IP address of the client. Based on the IP address (or other factors), the load balancer determines whether there are any special routing instructions for the client by accessing a user cache. The user cache may report routing instructions to the load balancer. If the load balancer determines that there are special routing instructions for the client, the load balancer sends the HTTP request to the out-of-production virtual container of an application server (if the virtual container is the target environment of the client). The out-of-production virtual container (or the application server hosting the virtual container) delivers content to the point to node client. An "out-of production" virtual container generally refers to a virtual container that does not receive production traffic. If the load balancer determines that there are no special routing instructions for the client (i.e. the client is not a point to node client), the HTTP request is sent to the production routing server (or to any virtual container of any server except the out-of-production virtual container).

Exemplary Computer System Overview

Figure 8:
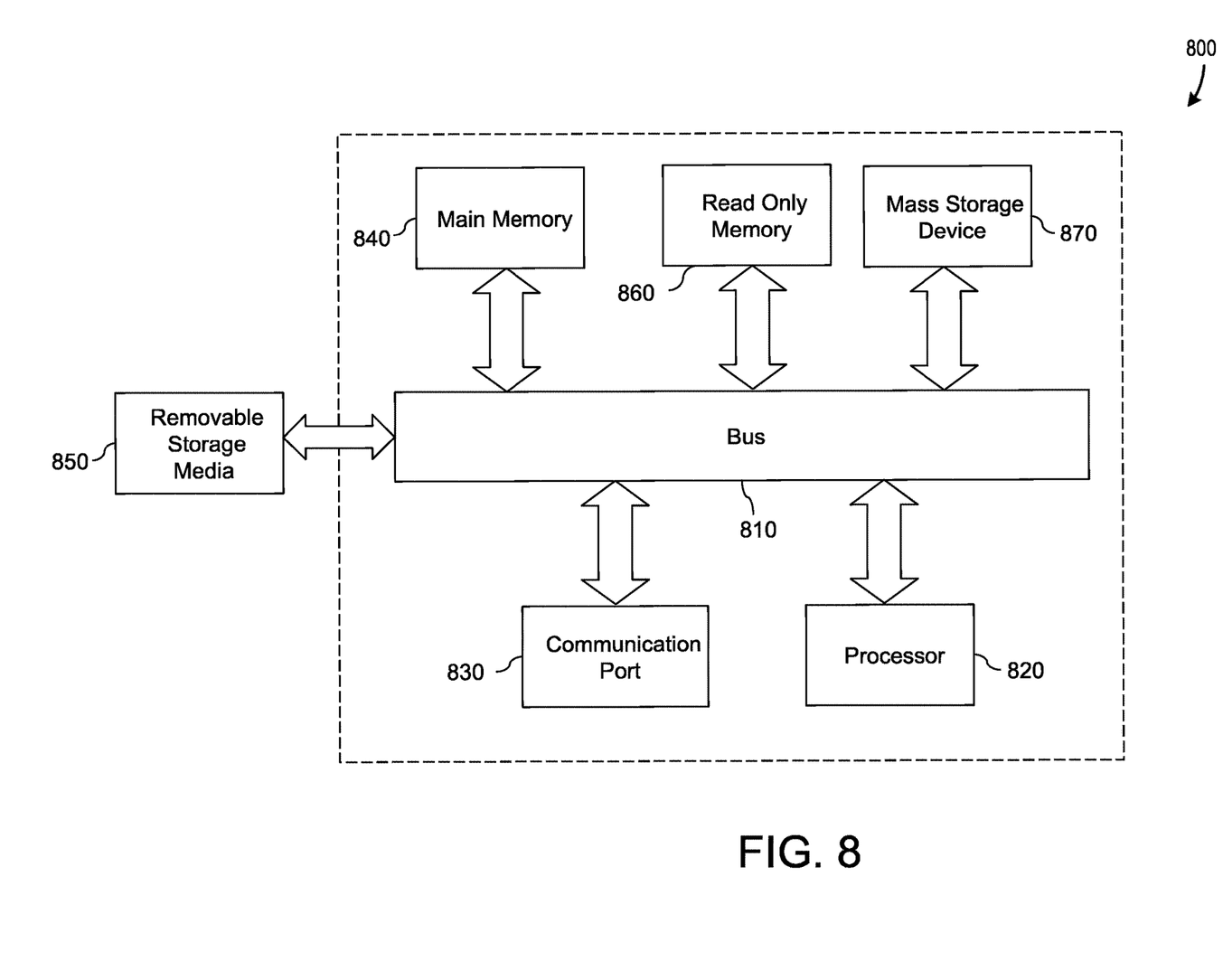
FIG. 8 illustrates an example of a computer system with which one or more embodiments of the present invention may be utilized.

Embodiments of the present invention include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 8 is an example of a computer system 800 with which embodiments of the present invention may be utilized. According to the present example, the computer system includes a bus 810, at least one processor 820, at least one communication port 830, a main memory 840, a removable storage media 850, a read only memory 860, and a mass storage 870.

Processor(s) 820 can be any known processor, such as, but not limited to, an Intel® Itanium® or Itanium 2® processor(s); AMD® Opteron® or Athlon MP® processor(s); or Motorola® lines of processors. Communication port(s) 830 can be any of an RS-232 port for use with a modem-based dialup connection, a 10/100 Ethernet port, or a Gigabit port using copper or fiber. Communication port(s) 830 may be chosen depending on a network such as a Local Area Network (LAN), Wide Area Network (WAN), or any network to which the computer system 800 connects.

Main memory 840 can be Random Access Memory (RAM) or any other dynamic storage device(s) commonly known in the art. Read only memory 860 can be any static storage device(s) such as Programmable Read Only Memory (PROM) chips for storing static information such as instructions for processor 820.

Mass storage 870 can be used to store information and instructions. For example, hard disks such as the Adaptec® family of SCSI drives, an optical disc, an array of disks such as RAID, such as the Adaptec family of RAID drives, or any other mass storage devices may be used.

Bus 810 communicatively couples processor(s) 820 with the other memory, storage and communication blocks. Bus 810 can be a PCI/PCI-X or SCSI based system bus depending on the storage devices used.

Removable storage media 850 can be any kind of external hard-drives, floppy drives, IOMEGA® Zip Drives, Compact Disc—Read Only Memory (CD-ROM), Compact Disc—Re-Writable (CD-RW), and/or Digital Video Disk—Read Only Memory (DVD-ROM).

The components described above are meant to exemplify some types of possibilities. In no way should the aforementioned examples limit the scope of the invention, as they are only exemplary embodiments.

In conclusion, embodiments of the present invention provide novel systems, methods and arrangements for directing requests to a particular node in a multi-tiered middleware environment. While detailed descriptions of one or more embodiments of the invention have been given above, various alternatives, modifications, and equivalents will be apparent to those skilled in the art without varying from the spirit of the invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations that fall within the scope of the claims, together with all equivalents thereof. Therefore, the above description should not be taken as limiting the scope of the invention, which is defined by the appended claims.

What is claimed is:

1. A non-transitory, computer-readable storage medium comprising a set of instructions, that, when executed by one or more processors, causes a machine to:
   receive, at a load balancer, a request to access content from a farm of application servers within a multi-tiered environment;
   determine whether the request originated from a point to node client,
      wherein the point to node client is identified by IP address on a list of IP addresses of point to node clients to be routed to a first application server in the farm of application servers,
      wherein the first application server is not accepting traffic from non-point to node clients;
   determine whether the request is a request to access content from the first application server;
   in response to the request originating from the point to node client and the request being a request to access content from the first application server, route the request to the first application server; and
   in response to the request originating from the non-point to node client, route the request to a second application server that is different from the first application server.

2. The non-transitory, computer-readable storage medium of claim 1, wherein the set of instructions, when executed by the one or processors, further causes the machine to remove the first application server from normal load balancing production routing.

3. The non-transitory, computer-readable storage medium of claim 2, wherein the set of instructions that, when executed by the one or more processors, causes the machine to remove the first application server from the normal load balancing production routing include instructions that when executed by the one or more processors, causes the machine to use a host file manager to identify the first application server as removed from the normal load balancing production routing.

4. The non-transitory, computer-readable storage medium of claim 1, wherein the set of instructions that, when executed by the one or more processors, causes the machine to determine whether the request originated from the point to node client include instructions that, when executed by the one or more processors, cause the machine to access a user cache within the load balancer.

5. The non-transitory, computer-readable storage medium of claim 1, wherein the request is a hypertext transfer protocol (HTTP) request.

6. The non-transitory, computer-readable storage medium of claim 1, wherein routing the request to the first application server is further based on a context root associated with the request.

7. The non-transitory, computer-readable storage medium of claim 1, wherein the set of instructions, when executed by the one or processors, further cause the machine to validate the first application server and allow the first application server to accept future requests from normal load balancing production routing.

8. A system comprising:
   a load balancer communicably coupled to a plurality of clients and a plurality of application servers,
      wherein the plurality of application servers includes a first application server that is out-of-production, wherein the first application server is in a farm of application servers within a multi-tiered environment;
   wherein the load balancer is configured to:
      receive a request to access content from the farm of application servers;
      determine whether the request originated from a point to node client,
         wherein the point to node client is identified by IP address on a list of IP addresses of point to node clients to be routed to the first application server, wherein the first application server is not accepting traffic from non-point to node clients;
      determine whether the request is a request to access content from the first application server;
      in response to the request originating from the point to node client and the request being a request to access content from the first application server, route the request to the first application server; and
      in response to the request originating from the non-point to node client, route the request to a second application server that is different from the first application server.

9. The system of claim 8, wherein the load balancer includes a host file manager configured to update a user cache within the load balancer to map the point to node client to the first application server.

10. The system of claim 8, wherein determining whether the request is a request to access content from the first application server is based on a context root associated with the request.

11. The system of claim 8, wherein the request is hypertext transfer protocol (HTTP) request.

12. The system of claim 8, wherein the load balancer is further configured to identify an origination of the request using cookie information and headers.

13. The system of claim 8, wherein the farm of application servers includes a proxy to identify the request from the point to node client and allow access to the first application server.

14. The system of claim 8, further comprising a graphical user interface module to allow a user to identify the point to node client and associate the point to node client with the first application server.

15. A method comprising:
    receiving, at a load balancer, a request to access content from a farm of application servers within a multi-tiered environment;
    determining whether the request originated from a point to node client,
        wherein the point to node client is identified by IP address on a list of IP addresses of point to node clients to be routed to a first application server in the farm of application servers,
        wherein the first application server is not accepting traffic from non-point to node clients;
    determining whether the request is a request to access content from the first application server;
    in response to the request originating from the point to node client and the request being a request to access content from the first application server, routing the request to the first application server; and
    in response to the request originating from the non-point to node client, routing the request to a second application server that is different from the first application server.

16. The method of claim 15, wherein routing the request to the first application server is based on a context root associated with the request.

17. The method of claim 15, further comprising: indicating to the load balancer that the first application server is out-of-production.

18. The method of claim 15, further comprising: identifying an origination of the request using cookie information and headers.

19. The method of claim 15, further comprising: associating the point to node client with the first application server using a mapping.

20. The method of claim 15, further comprising:
    returning traffic from the first application server; and
    routing the return traffic to the point to node client.

\* \* \* \* \*